United States Patent [19]

Moore

[11] 4,398,574
[45] Aug. 16, 1983

[54] METHOD FOR INFLATING DUAL PNEUMATIC TIRES

[76] Inventor: Ira V. Moore, 25540 B Lynn Pl., Madera, Calif. 93638

[21] Appl. No.: 315,927

[22] Filed: Oct. 28, 1981

[51] Int. Cl.³ .............................................. B65B 3/04
[52] U.S. Cl. .......................................... 141/1; 141/4; 141/98; 141/382; 81/121 R; 152/415
[58] Field of Search ............... 81/121 R, 64; 152/415; 285/346, 312; 141/1-12, 98, 346-362, 37-66; 137/1, 12, 223, 231

[56] References Cited

U.S. PATENT DOCUMENTS

| | | |
|---|---|---|
| 1,221,276 | 4/1917 | Bolander . |
| 2,344,740 | 3/1944 | Shaff . |
| 2,508,503 | 5/1950 | Doepke . |
| 2,837,350 | 6/1958 | Druge . |
| 3,280,879 | 10/1966 | Simms . |
| 3,905,622 | 9/1975 | Donley . |

FOREIGN PATENT DOCUMENTS

| | | |
|---|---|---|
| 476954 | 5/1929 | Fed. Rep. of Germany .... 81/121 R |
| 737881 | 10/1932 | France . |
| 461138 | 6/1951 | Italy . |

*Primary Examiner*—Houston S. Bell, Jr.
*Attorney, Agent, or Firm*—Gerald L. Moore

[57] ABSTRACT

A method for inflating the inner tire of dual pneumatic wheels wherein a valve extender is used which can be easily attached and detached. The extender includes a coupling on one end which grips the wheel valve stem and a connector at the other end adapted for engagement with the air supply hose. Another tool is used for removing and replacing the mud cap.

1 Claim, 5 Drawing Figures

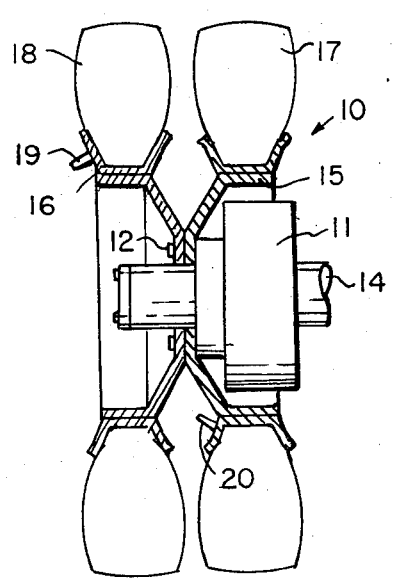
FIG. 1.
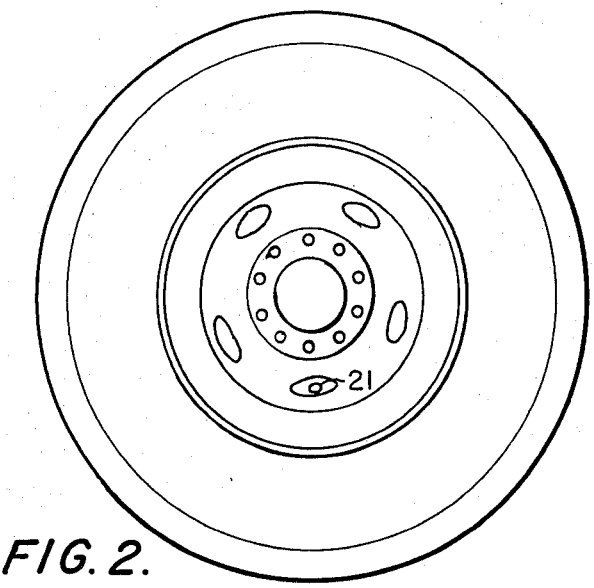
FIG. 2.
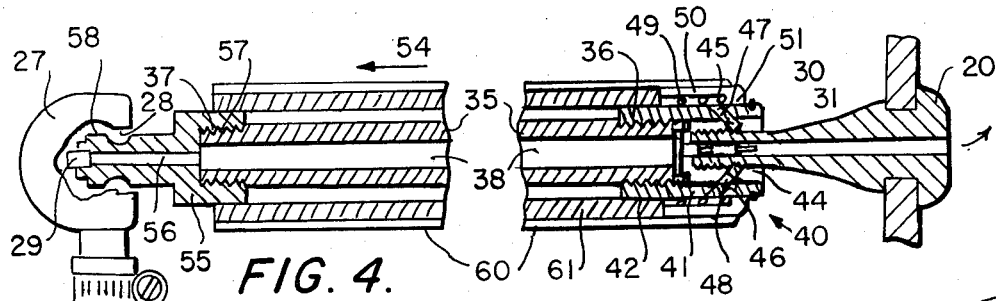
FIG. 4.
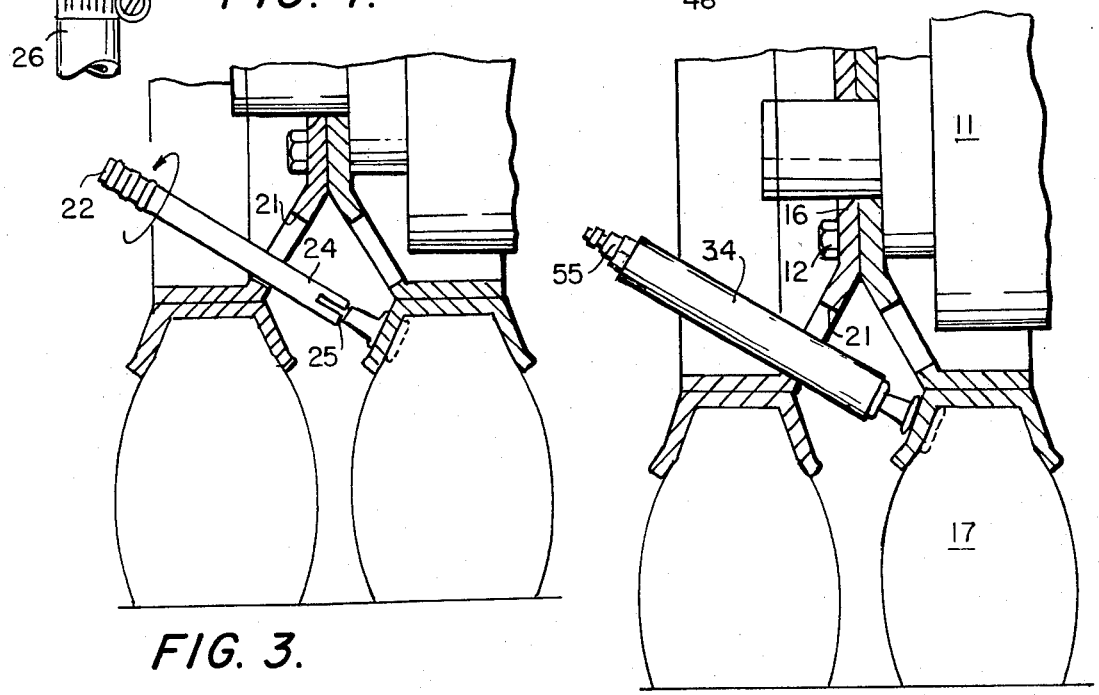
FIG. 3.
FIG. 5.

METHOD FOR INFLATING DUAL PNEUMATIC TIRES

BACKGROUND OF THE INVENTION

In inflating dual wheels of a truck, it is difficult to reach the valve stem of the inner tire. First there is the difficult task of removing the mud cap. Then the air nozzle must be inserted through a hole in the rim of the outer wheel and, if the tires are very big, the nozzle must be extended anywhere from 8 to 10 inches through the outer wheel to reach the valve stem of the inner wheel. At times the air nozzle includes a rigid metallic end of sufficient length to reach through the wheels but many times such is not available.

One method of attempting to solve the inflating problem involves the permanent attachment of valve stem extenders onto the stems of the inner wheel. These extenders are configured to extend in a direction substantially parallel to the wheel axle and across the distance between the duals wheels and into an opening in the outside wheel. Such extenders usually allow inflation of the inner wheel but they are subject to breakage when the truck is driven through mud or rock. Frequently such material is forced between the wheels with sufficient pressure to either bend and break the extender or break the valve stem itself. In either instance the inner wheel is deflated and possibly the vehicle is incapacitated. It is the purpose of the present invention to provide a method to allow inflation of the inner wheels of dual truck wheels.

SUMMARY OF THE INVENTION

A method of inflating the inner tire of dual wheels comprising the use of a first elongated tool to grasp and unscrew the mud cap. Thereafter a second tool comprising an elongated body and means for attachment to the valve stem is attached to the stem and air is supplied through the second tool to the tire. With removal of the second tool the mud cap can again be replaced by use of the first tool.

DESCRIPTION OF THE DRAWINGS

FIG. 1 is a cross-sectional view of a standard truck dual wheel;

FIG. 2 is a side view of the wheel shown in FIG. 1;

FIG. 3 is an enlarged partial view of a cross section of a dual wheel showing the valve cap remover;

FIG. 4 is a cross-sectional view of the valve stem extender attached to a valve stem; and FIG. 5 is a cross-sectional view of a portion of a dual wheel with the valve stem extender attached.

DESCRIPTION OF THE INVENTION

Shown in FIG. 1 in cross section is a dual wheel 10 mounted on a hub 11 by bolts 12. The hub is supported on an axle 14. The dual wheels comprise a pair of wheels 15 and 16 on which are mounted the inflatable rubber tires 17 and 18, respectively. As can be seen, the rims butt together in the central area for attachment to the hub.

The outer tire 18 is inflated through the valve stem 19 which extends outside the wheel. The inner tire 17 is inflated through the valve stem 20 which extends axially towards the outer wheel 16. To accommodate the placement of an air nozzle onto the valve stem 20 there are provided holes 21 (see FIG. 2) in the outer wheel 16, one of which coincides with the position of the valve stem of the inner wheel. However these holes are frequently too small for the hand to reach through, thereby making the removal of the mud cap and connection between the air hose and the valve stem very difficult.

It is the purpose of the present invention to provide a method enabling the easy inflation of the inner wheel of dual wheels. For that purpose there is provided a first tool 22 (FIG. 3) which includes a hollow end 24 forming a center opening of the proper size to fit over the mud cap 25 which is screwed onto the valve stem. This cap must be removed before the tire can be inflated and serves primarily to keep dirt and moisture out of the valve 31 (FIG. 4) within the valve stem 30. The tool is inserted through the opening 21 in the outer wheel and lightly pressed down over the valve cap. Thereafter by turning the tool 22, the valve cap can be screwed from the valve stem. The loosened valve cap will remain in the tool and can thereafter be removed and screwed back on the valve stem in the reverse manner.

Air is conducted into a valve stem through an air hose 26 (FIG. 4) which usually terminates in a connector 27 having a center opening 28 therein which fits down over the extending end of a valve stem. A pin 29 in the coupler depresses the valve stem actuator 30 to open the valve 31 and allow the pressurized air to flow into the tire. Obviously it is very difficult to make a proper connection with the valve stem 20 positioned inside the outer wheel of the dual wheels.

The valve stem extender 34 is provided to connect onto the valve stem 20 at one end and extend through the opening 21 in the outer wheel to a position where easy connection can be made with the coupler 27 on the air hose 26. For this purpose the extender comprise a main body member 35 having threaded ends 36 and 37 with a central air passage 38. Screwed onto the end 36 of the main body member 35 is a connector 40 serving as means for attachment to the valve stem. This connector 40 is of a standard design and includes a main body 41 having an internally threaded passage 42 in one end. The other end is of slightly smaller diameter and includes a central opening 44 which fits over the extending end of a valve stem.

For attachment to the valve stem there is provided a pair of valve stem gripping means or members 45 and 46 resting in slots 47 and 48, respectively. These gripping members are positioned so as to extend slightly into the center opening 44. A spring 49 presses against the gripper members and forces them into the position shown in FIG. 4. To retract the gripper members, an outer sleeve 50 is provided having an inner flange 51 which contacts and depresses the spring when the sleeve is moved longitudinally relative to the main body member in the direction of the arrow 54. This allows the gripper members to move back into the slots 47 and 48, respectively, so that the stem can enter the opening 44. Thereafter by release of the sleeve 50, the spring 49 is permitted to force the gripper members into contact with the valve stem, thereby holding the coupler thereon.

Threaded on the outside end 37 of the extender is a coupling 55 having an inner passage 56 through which air can flow. The passage is enlarged and includes internal threads 56 adapted to screw over the threaded end 37 of the body member 35. The center passage 56 is sized to receive the pin 29 of the air coupler 27. The outer end 58 is sized to fit within the coupler and seal therewith so that air can pass through the inner passage 56 and into the air passage 38 of the main body member.

Serving as means for actuating the coupler 40 is an outer sleeve 60 which is pressfit over the body member 41 of the coupler 40. The sleeve 60 is hollow with the center opening 61 of sufficient diameter to slide over the outer diameter of the connector 55. Thus for actuation of the coupler 40 the sleeve 60 is pulled in the direction of the arrow 54 towards the coupler 55 causing the sleeve 50 to depress the spring 49 and allow proper connection to be made between the coupler and the valve stem 20. When this is accomplished, the extender 34 is positioned in the manner shown in FIG. 5 extending through the opening 21 of the outer wheel 16 with the connector 55 being positioned for easy attachment to the air nozzle 27. After the tire 17 is sufficiently inflated the extender is removed by once again pulling on the outer sleeve 60 to release the grippers from the valve stem. Thereafter the valve cap can be replaced by use of the tool 22.

The invention claimed:

1. The method of adding pressured air to dual pneumatic tires wherein both tires have valve stems through which air is added and on which is threaded a mud cap, the method comprising the steps of:

providing an elongated first tool having an end forming a cavity for fitting over and grasping the mud cap;

placing the elongated first tool in position over said mud cap and twisting the first tool to screw said mud cap off of said stem;

removing the first tool and mud cap from said pneumatic tire;

providing a second elongated tool comprising a hollow tube having a first end forming an air intake and a second end forming a cavity for fitting over said valve stem and having gripping means released by pushing on said air intake while pulling on said hollow tube;

placing said second elongated tool second end over said valve stem while pushing on said air intake and pulling on said hollow tube and then releasing said hollow tube to allow said gripping means to grip said valve stem and hold said second tool in place;

placing a source of air in contact with said air intake to supply air to said pneumatic tire, and then removing said air source;

pushing on said air intake while pulling on said hollow tube to release said gripping means;

removing said second tool from said valve stem;

replacing said mud cap with said first tool and screwing said mud cap on said valve stem; and removing said first tool from said mud cap.

* * * * *